US012686336B2

(12) United States Patent　　(10) Patent No.:　US 12,686,336 B2
Guo et al.　　(45) Date of Patent:　Jul. 21, 2026

(54) ELECTRIC POWERED SIDE STEP ASSEMBLY FOR A VEHICLE

(71) Applicant: BOLD PICKUP PARTS INC., Vancouver (CA)

(72) Inventors: Fu Guo, Vancouver (CA); Yongzhi Guo, Vancouver (CA)

(73) Assignee: BOLD PICKUP PARTS INC., Vancouver (CA)

( * ) Notice: Subject to any disclaimer, the term of this patent is extended or adjusted under 35 U.S.C. 154(b) by 332 days.

(21) Appl. No.: 18/635,386

(22) Filed: Apr. 15, 2024

(65) Prior Publication Data

US 2025/0319820 A1　　Oct. 16, 2025

(51) Int. Cl.
　B60R 3/02　　(2006.01)
(52) U.S. Cl.
　CPC ...................................... B60R 3/02 (2013.01)
(58) Field of Classification Search
　CPC　B60R 3/02; B60R 3/002; B60R 3/007; B60R
　　　　　　　　　　　　　　　　　　　　3/005
　USPC ......................................................... 280/166
　See application file for complete search history.

(56) References Cited

U.S. PATENT DOCUMENTS

| 3,608,957 | A | * | 9/1971 | Maneck | ..................... | B60R 3/02 |
| | | | | | | 280/166 |
| 3,887,217 | A | * | 6/1975 | Thomas | .................... | B60R 3/02 |
| | | | | | | 280/166 |

| 5,358,268 | A | * | 10/1994 | Hawkins | ................... | B60R 3/02 |
| | | | | | | 280/166 |
| 5,842,709 | A | * | 12/1998 | Maccabee | ................. | B60R 3/02 |
| | | | | | | 182/127 |
| 6,641,158 | B2 | * | 11/2003 | Leitner | ................... | B60R 3/002 |
| | | | | | | 280/169 |
| 7,367,574 | B2 | * | 5/2008 | Leitner | ..................... | B60R 3/02 |
| | | | | | | 280/166 |
| 7,469,916 | B2 | * | 12/2008 | Watson | ..................... | B60R 3/02 |
| | | | | | | 280/166 |
| 8,833,781 | B2 | * | 9/2014 | Hayes | ....................... | B60R 3/02 |
| | | | | | | 280/166 |
| 9,302,626 | B2 | * | 4/2016 | Leitner | ..................... | B60R 3/02 |
| 9,527,449 | B2 | * | 12/2016 | Smith | ................... | B60R 16/023 |

(Continued)

FOREIGN PATENT DOCUMENTS

| CN | 201822215782.7 | U | 12/2018 |
| CN | 215154291 | U | 12/2021 |

(Continued)

*Primary Examiner* — James A Shriver, II
*Assistant Examiner* — Hilary L Johns
(74) *Attorney, Agent, or Firm* — BACON & THOMAS.PLLC

(57)　　　　　　ABSTRACT

An extendable and retractable drop step positioned below a door of a vehicle to assist a person in climbing into the vehicle includes a driving linkage mechanism for moving the drop step to and from an extended position, and a telescoping lateral support arm structure having left and right swing arms respectively connected at both ends to a main support and to sides of the drop step by universal joints that rotate and pivot in multiple directions so that the support arm structure bears loads on the step without interfering with a trajectory of the step determined by the driving linkage mechanism. An extended position of the step is defined by limit stops or positioning limiting mechanisms included in the support arm structure.

15 Claims, 19 Drawing Sheets

(56)         References Cited

U.S. PATENT DOCUMENTS

| | | | |
|---|---|---|---|
| 10,106,088 B2 | 10/2018 | Smith | |
| 10,427,607 B2 * | 10/2019 | Otacioglu ............... | B60R 3/002 |
| 11,077,802 B2 * | 8/2021 | Long ........................ | B60R 3/02 |
| 11,590,897 B2 * | 2/2023 | Qing ........................ | B60R 3/02 |
| 2006/0175791 A1 * | 8/2006 | Kaempe ................. | B60R 3/002 |
| | | | 280/166 |
| 2007/0017743 A1 * | 1/2007 | Yeh .......................... | B60R 3/02 |
| | | | 182/127 |
| 2019/0084482 A1 * | 3/2019 | Long ....................... | B60R 3/002 |

FOREIGN PATENT DOCUMENTS

| | | |
|---|---|---|
| JP | 63-255144 A | 10/1988 |
| TW | M296187 U | 8/2006 |
| TW | M318551 U | 9/2007 |
| WO | WO2003/039910 A1 | 5/2003 |

* cited by examiner

15

24

14

24

FIG. 17                                        FIG. 18
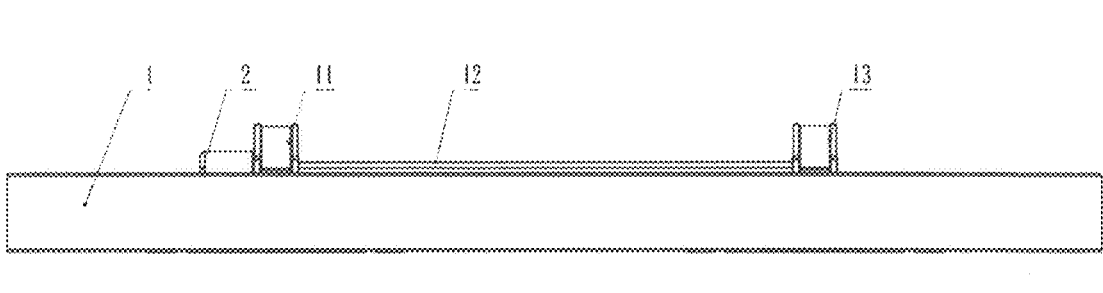
FIG. 19
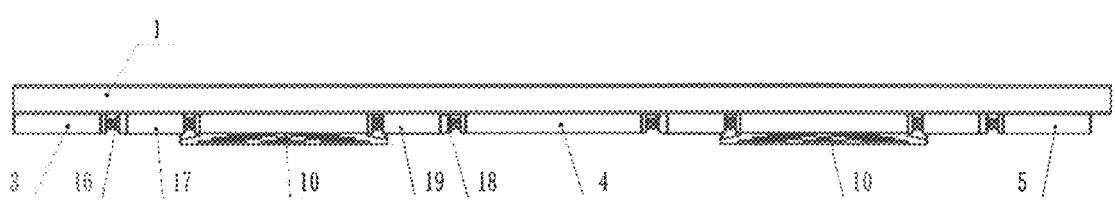
FIG. 20

20

3

20

ELECTRIC POWERED SIDE STEP ASSEMBLY FOR A VEHICLE

BACKGROUND OF THE INVENTION

1. Field of the Invention

The present invention relates to an electric powered side step assembly including at least one drop step positioned below a door of a vehicle, to assist a person in climbing into the vehicle by providing a step between the ground and the floor in the interior of the vehicle. The drop step is retracted when not in use, and extendable when a person wishes to enter the vehicle.

The electric powered side step assembly of the present invention features improvements to the electric powered side step assembly disclosed in copending U.S. patent application Ser. No. 18/533,801, filed Dec. 8, 2023, and incorporated by reference herein.

The improvements include a simplified driving linkage mechanism that is not limited to a fixed trajectory for extending and retracting the drop step, and a less, complex, more robust simplified limit stop arrangement for defining the expended position of the drop step, and for bearing loads on the drop step when in the extended position. The improved electric powered step has reduced power consumption, lower production cost, and is less exposed to environmental hazards such as dust, while still maintaining advantages of the electric powered step disclosed in copending U.S. patent application Ser. No. 18/533,801, including decoupling of the load-bearing mechanism from the power transmission mechanism that extends and retracts the step, so that the power transmission components are not subject to loads on the extended step that could damage or cause misalignment of the power transmission components.

The improved electric power step of the invention may optionally utilize the same intelligent control features as the electric powered step described in copending U.S. patent application Ser. No. 18/533,801, with extension and retraction of the step being controlled through a mobile app or Infotainment system interface, via an electronic control unit of the vehicle. In addition, the principles of the invention may be applied to a single drop step, or a pair of synchronously-operated drop steps.

2. Description of Related Art

Side steps or running boards are steps that are placed on the exterior of a vehicle, between the doors of the vehicle and the ground, to assist a driver or passenger in entering and leaving the vehicle. Such steps are helpful when the vehicle has a high ground clearance. However, because the conventional fixed side step extends from the side of the vehicle, it can be struck by the door opening of an adjacent vehicle, scrape against a high curb, tree, or other curbside obstruction, or be exposed to damage during off-road use of the vehicle. In addition, a relatively short user might still have difficulty in reaching the step if the step is too far from the ground, or in entering the vehicle from the step if the step is positioned too low, while a relatively tall user of the conventional fixed side step might bump his or her head while climbing into the vehicle cab if the step's position is too high.

Too solve the problem that a laterally extending step is vulnerable to damage while the vehicle is moving or during parking, numerous proposals have been made to enable retraction of the step when not required to enter or exit the vehicle. The proposals include both purely mechanical and electric powered extension/retraction mechanisms. For example, an early version of a mechanically-retractable running board for a vehicle is disclosed in U.S. Pat. No. 3,608,957. The running board is coupled to the sliding door of a passenger van, and extends using a swinging mechanism coupled to the sliding door, so that the running board extends when the sliding door is opened. A spring holds the running board in a retracted position when the door is closed.

More common are proposals to power the side step by an electric motor, which is easier to operate and is not vulnerable to misalignment between the mechanism and the door. Examples of electric powered side step assemblies that extend in a non-horizontal trajectory, utilizing various swinging, pivoting, and/or crank mechanisms are disclosed in U.S. Pat. Nos. 3,887,217; 5,358,268; 5,842,709; 6,641, 158; 7,367,574; 8,833,781; 9,302,626; 9,527,449; and 10,106,088; PCT Publication No. WO2003/039910; Chinese Patent Publication No. 201822215782.7; and Japanese Patent Publication No. 63-255144. Examples of steps that extend horizontally rather than along a curved or inclined trajectory are disclosed in U.S. Pat. Nos. 7,469,916; 10,427, 607 and 11,077,802; and. Taiwan Patent Publication Nos. M296187 and M318551.

Each of the mechanisms described in these patents has the disadvantage that the driving linkage mechanism bears, at least in the extended position, the weight of a person using the step (referred to herein as a "drop step") to enter the vehicle. As a result, because the drop step serves both the purpose of providing a stepping surface and as the connection and torque transmission device, even the slightest surface deformation due to stepping may result in operational errors such as getting jammed, misalignment between the front and rear steps, and not extending or retracting properly. In addition, many of the prior electric-powered side step assemblies are complex and expensive to produce, and have mechanisms exposed to dust and the environment, which can cause malfunctions or premature wear.

A prior solution to the problem of loads on the power transmission mechanism of an electric side step assembly is disclosed in Chinese Patent Publication No. CN 215154291. This publication proposes an electric step mechanism in which the step is supported by telescoping lateral support arms hinged at opposite ends to pivot about a fixed angle. However, because the support arms determine the trajectory of the step, the trajectory cannot be varied, and the support arms and hinges must bear the entire weight of a user of the step.

Copending application Ser. No. 18/533,801 offers a further solution to the above-described problems, by decoupling the driving linkage mechanism from the support mechanism when the step is in the extended position, and by adding a linear guide to the telescoping lateral support arms, with the linear guide and limit stops in the linear guide bearing the loads on the step when the step is in the extended position. The driving linkage mechanism includes a crank and guides that constrain the trajectory of the step to a linear path, with the final extended position of the step being defined by the load-bearing limit stops fixed to ends of the guides. The telescoping lateral support arms extend from the sides of the step to a fixed support on the vehicle to sides of the step, and are hinged to follow the lateral movement of the step to and from the extended position.

While the arrangement described in copending U.S. patent application Ser. No. 18/533,801 has a number of advantages over prior electric power steps, the driving and linkage mechanism and the limit stop arrangement are relatively complicated in comparison with those of the present invention, and the number of parts and arrangement of the driving and linkage mechanism disclosed in the copending application requires a convoluted and relatively costly dust shield or cover structure. In addition, extension of the step in the described examples is limited to a fixed trajectory, defined by a linear guide and the fixed angle of hinges at opposite ends of the electric powered step's telescoping lateral supporting structures, which might not be optimal for all vehicles in which the electric-powered side step assembly might be utilized.

Still further, the inclined cylinder rods and inclined sliding cylinders of the electric side step described in the copending application may, due to their structural design, interfere with the step's motion trajectory. Therefore, any loss of accuracy and efficiency during machining and assembly of the rods and cylinders may cause the existing drop step to have unstable movement. Moreover, because the driving linkage mechanism of the prior electric-powered side step assembly utilizes an over-center crank arrangement, the driving linkage mechanism is subject to excessive power loss.

SUMMARY OF THE INVENTION

It is accordingly an objective of the invention to provide an electric powered step assembly for a vehicle that has relatively low production costs and power consumption, and increased reliability and service life.

It is a second objective of the invention to provide an electric powered side step assembly that eliminates the disadvantages of conventional electrically powered side step assemblies, such as getting jammed while moving, failing to move into the correct position, inconsistent movement trajectory, lack of synchronization between the front and rear steps, and limited functionality.

It is a third objective of the invention to provide a side step assembly with a power transmission mechanism that is separate from the load-bearing components, so that loads on the step cannot cause mis-alignment of the of the power transmission.

It is a fourth objective of the invention to provide an electric powered step assembly for a vehicle in which the step is supported in the extended position by lateral telescoping support arms that are separate from the power transmission mechanism, and yet that do not limit the electric-powered step to a fixed, linear extension trajectory.

It is a fifth objective of the invention to provide a side step assembly for a four door vehicle that includes both front and rear steps are moved synchronously by a single motor and rotating shaft, and separate torque transmission mechanisms, avoiding misalignment.

These and other objectives are achieved, in accordance with the principles of a preferred embodiment of the invention by an improved electric-powered side step assembly including at least one drop step having telescoping lateral supports made up of rotatable sliding rods and rotatable sliding cylinders, in which the rotatable sliding rods and rotatable sliding cylinders on both sides of the drop step can rotate in all directions, allowing the drop step to follow any trajectory provided by the driving linkage mechanism that transmits power from the actuating motor to the drop step.

By using a universal joint structure at each end of the lateral telescoping supports to enable rotation in all directions, the electric-powered side step assembly of the invention eliminates the need for a separate guiding mechanism and overcenter crank of the type disclosed in copending U.S. patent application Ser. No. 18/533,801, reducing excessive power losses in the driving linkage mechanism and also eliminating the need for a corresponding dust-proofing structure, which greatly reduces production costs and results in a simpler and more reliable overall structure. According to an exemplary embodiment of the invention, the extended-position-defining and supporting limit stops can be included in the telescoping lateral support structure rather than in a separate guiding mechanism, further reducing the number of parts and complexity of the driving linkage mechanism and the support structure.

Because the electric-powered side step assembly of the invention utilizes a drop step supported on both sides by telescoping lateral support structures, in which both ends of the lateral support structure's rotatable sliding rods and rotatable sliding cylinders can rotate universally without interfering with the drop step's movement trajectory, the step's movement trajectory can align perfectly with the movement trajectory of the linkage mechanism, resolving the issue of unstable movement.

Although the electric-powered side step assembly of the present invention provides a simpler and more stable extension mechanism, it can still include the smart control features described in copending U.S. patent application Ser. No. 18/533,801, including the ability to interface with the vehicle's central controller or infotainment system, and/or a smartphone app, and may further includes such convenience features as a heater for melting snow and ice on the step, as also described in the copending application.

These and other advantages of the invention may be understood in connection with the following description of exemplary embodiments of the invention, with reference to the appended drawings.

BRIEF DESCRIPTION OF THE DRAWINGS

FIG. 17 is an isometric view of a ball joint for the swing arm supports of FIGS. 13-15.

FIG. 18 is an isometric view of a ball joint seat for the swing arm supports of FIGS. 13-15.

FIG. 19 is a front view of an electric powered side step assembly constructed in accordance with the principles of a second exemplary embodiment of the present invention, with the steps in a retracted state;

FIG. 20 is the top view of the electric powered side step assembly of FIG. 19;

DETAILED DESCRIPTION OF THE PREFERRED EMBODIMENTS

FIGS. 1-18 show an electric powered side step assembly according to a first exemplary embodiment of the present invention. The electric powered side step assembly of this embodiment of the invention includes a power transmission mechanism, telescoping lateral supports with universal ball joints that enable the step to follow a non-linear trajectory, and limit stops in the rotatable sliding cylinders of the lateral support for defining an extended position of, and bearing loads on, the step or steps of the exemplary embodiment.

As illustrated in FIGS. 1-9, the electric powered side step assembly of the first exemplary embodiment includes a pair of side or drop steps 10, which are suspended from a main support bar 1 by respective pairs of telescoping lateral support assemblies. Although two steps are illustrated, the invention is not limited to a pair of steps, and may include electric-powered side steps that include only a single step. In addition, the configuration of the main support bar 1 may be varied, and the main support bar may be integrated with or included in the frame of the vehicle to which drop steps 10 are assembled.

Figure 7:
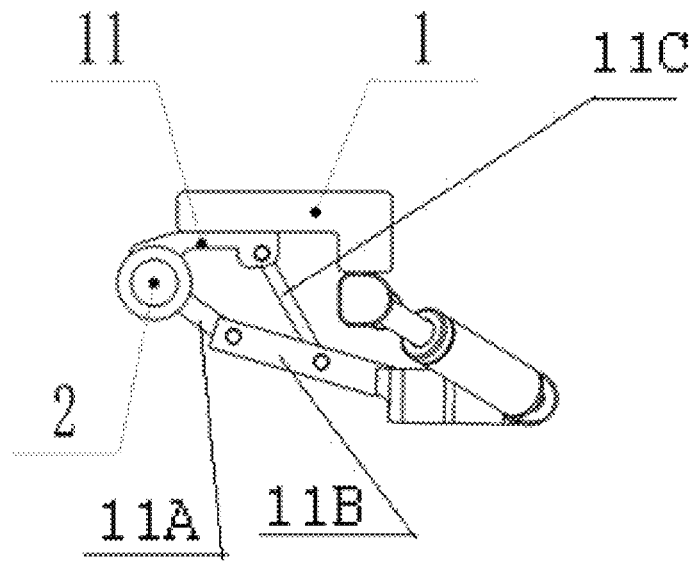
FIG. 7 is a left side view of the extended side step assembly shown in FIG. 5.
Figure 8:
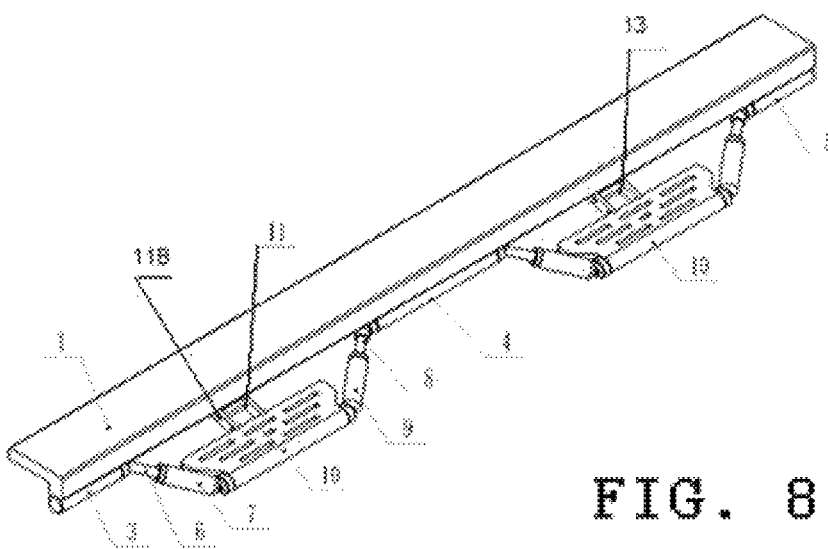
FIG. 8 is an isometric view of the extended side step assembly shown in FIG. 5.
Figures 8A, 8B, 8C:
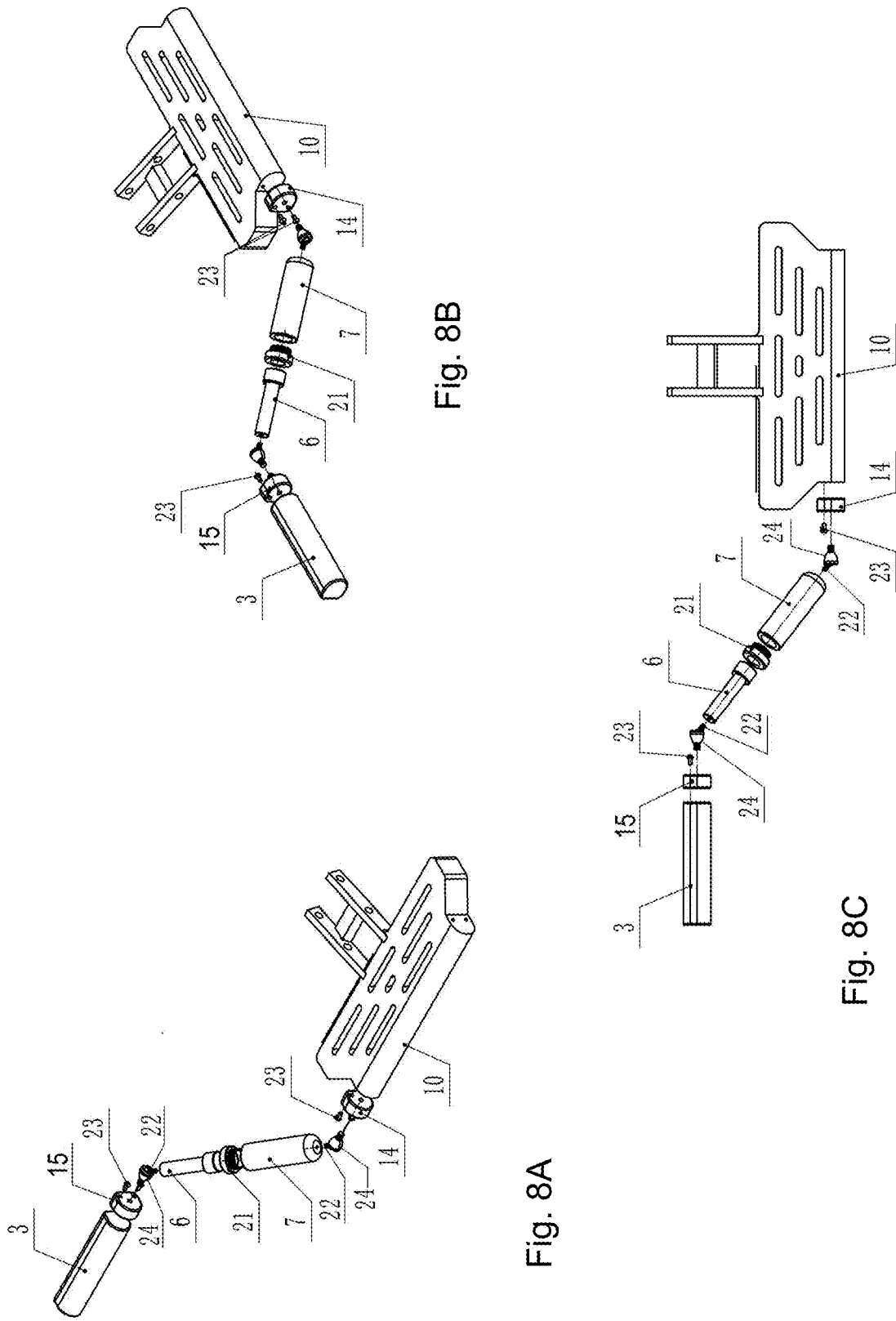
FIGS. 8A-8C are exploded isometric views of the left telescoping support structure included in the extended side step assembly of FIG. 8
Figure 9:
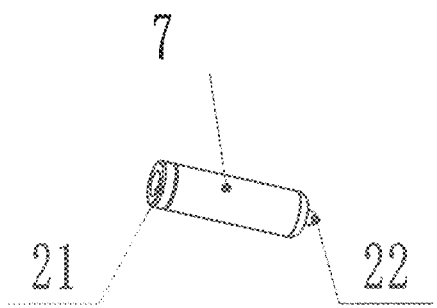
FIG. 9 is an isometric view of the rotatable sliding cylinder included in the telescoping lateral support structure of the exemplary embodiment of FIGS. 1-8.
Figure 10:
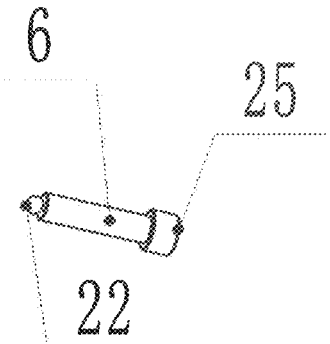
FIG. 10 an isometric view of a rotatable sliding rod assembly for inclusion in the lateral telescoping support structure of the side step assembly illustrated in FIGS. 1-9.
Figure 11:
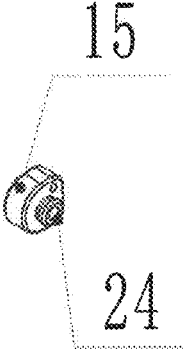
FIG. 11 is an isometric view of a left ball seat assembly for the rotatable sliding rod assembly of FIG. 10.
Figure 12:
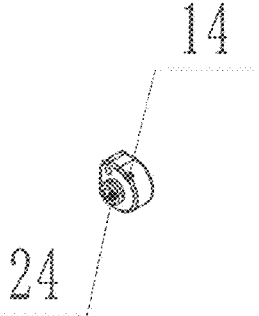
FIG. 12 is an isometric view of a right ball seat assembly for the rotatable sliding rod assembly of FIG. 10.
Figure 13:
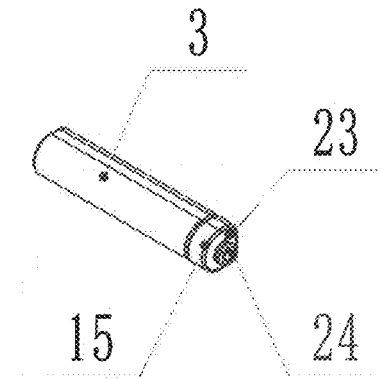
FIG. 13 is an isometric view of a left side swing arm support for the lateral telescoping support structure of the side step assembly of FIGS. 1-9.
Figure 14:
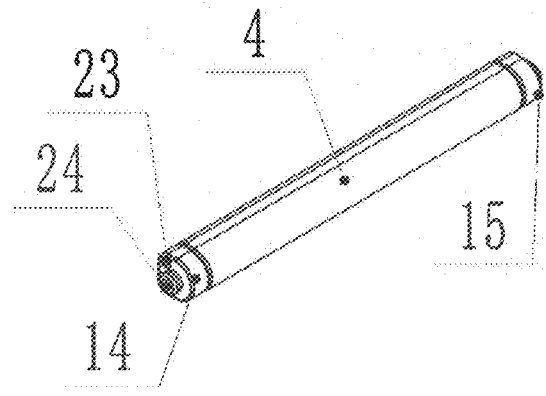
FIG. 14 is an isometric view of a center swing arm support for the lateral telescoping support structure of the side step assembly of FIGS. 1-9.
Figure 15:
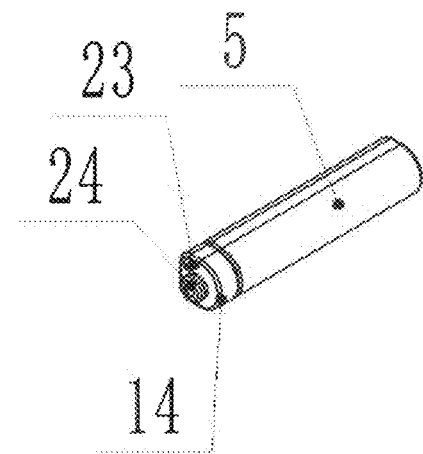
FIG. 15 is an isometric view of a right side swing arm support for the lateral telescoping support structure of the side step assembly of FIGS. 1-9.
Figure 16:
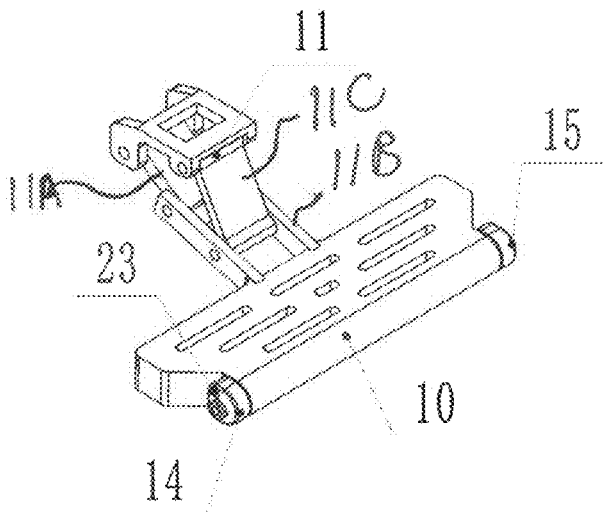
FIG. 16 is an isometric view of a driving linkage mechanism for the side step assembly of FIGS. 1-9.
Figure 21:
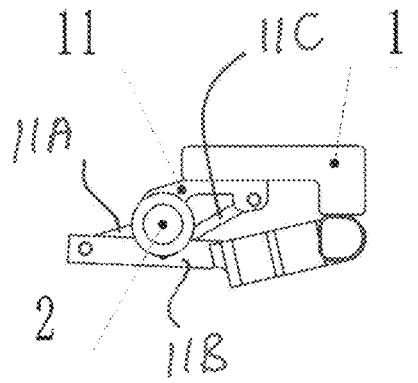
FIG. 21 is the left side view of the electric powered side step assembly of FIG. 19.
Figure 22:
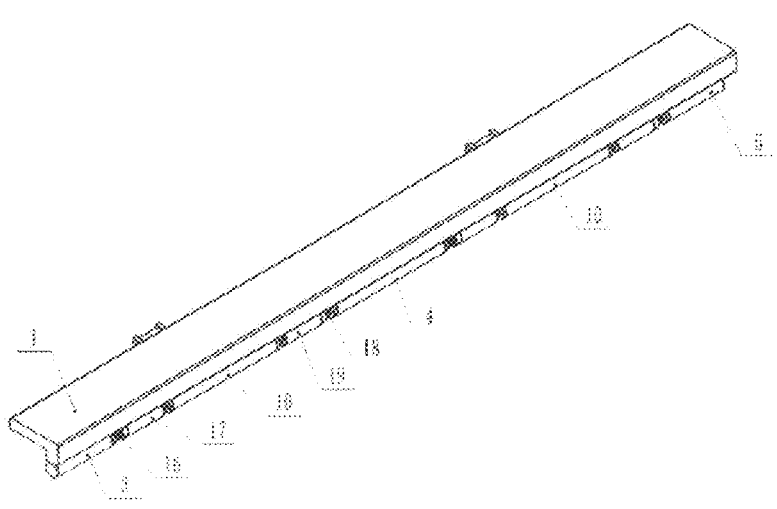
FIG. 22 is an isometric view of the electric powered side step assembly of FIG. 1, with the steps in a retracted state.
Figure 23:
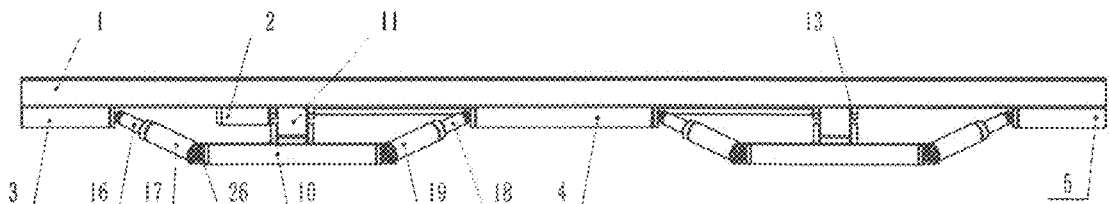
FIG. 23 is a front view of the electric powered side step assembly of FIG. 19, with the steps in an extended state.
Figure 24:
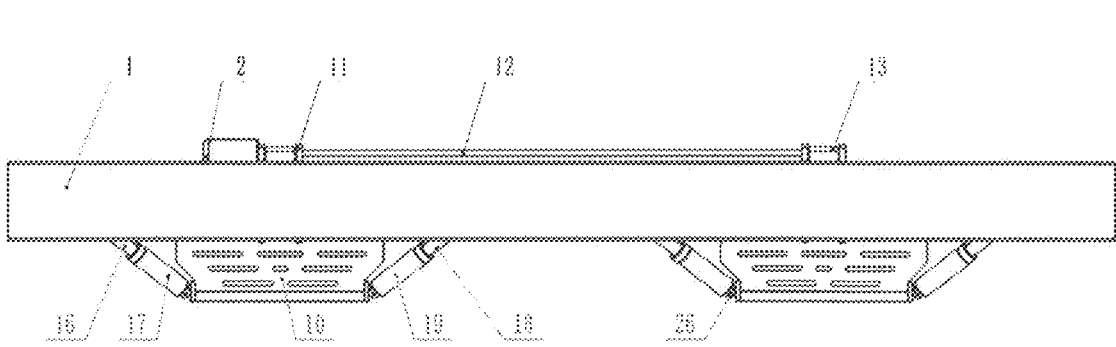
FIG. 24 is a top view of the extended side step assembly shown in FIG. 23.
Figure 25:
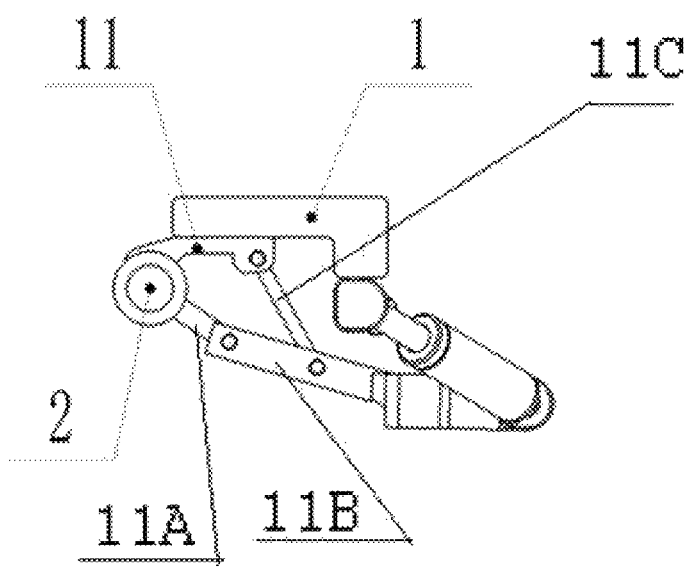
FIG. 25 is a left side view of the extended side step assembly shown in FIG. 23.
Figure 26:
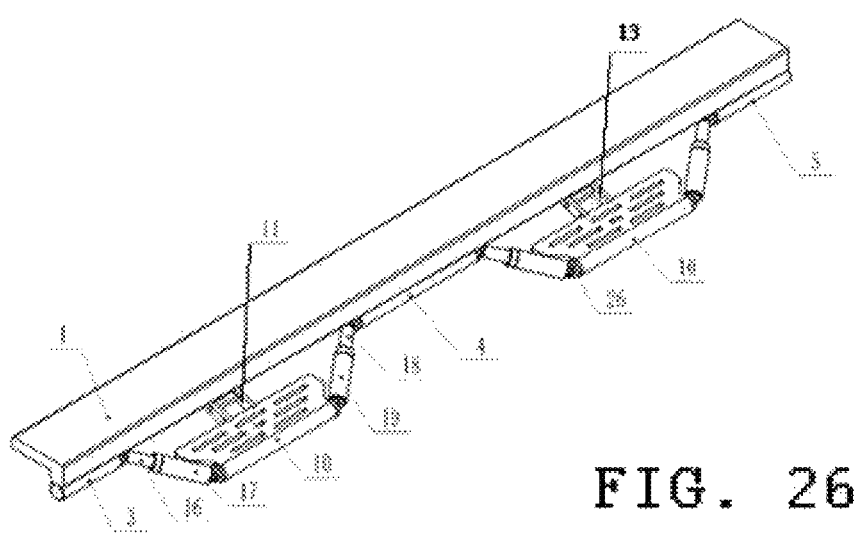
FIG. 26 is an isometric view of the extended side step assembly shown in FIG. 23.
Figure 26A:
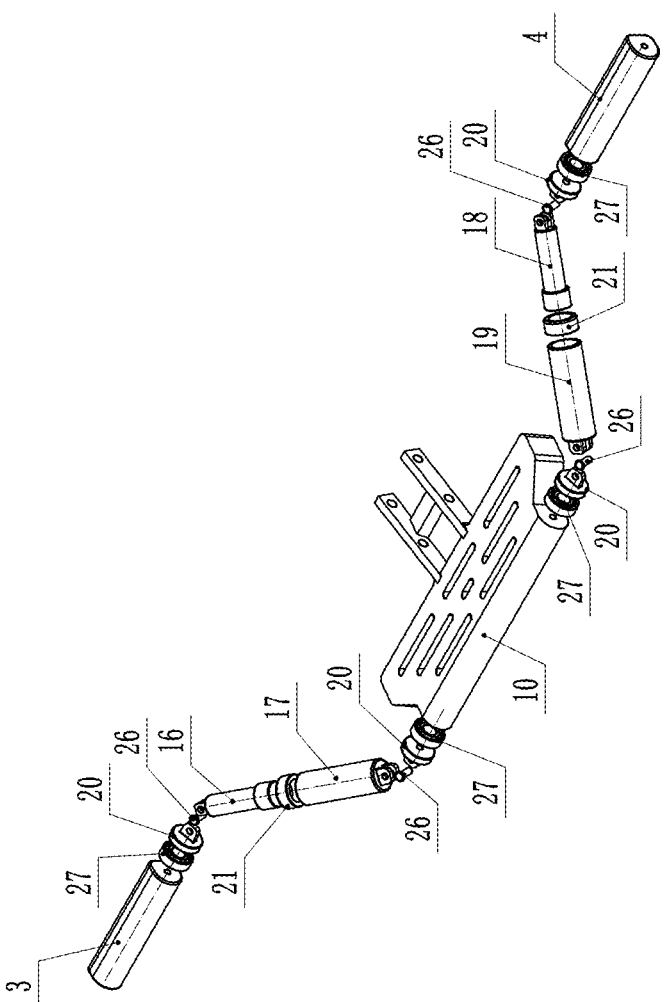
FIGS. 26A and 26B are exploded isometric views of the left telescoping support structure included in the extended side step assembly of FIG. 26.
Figure 26B:
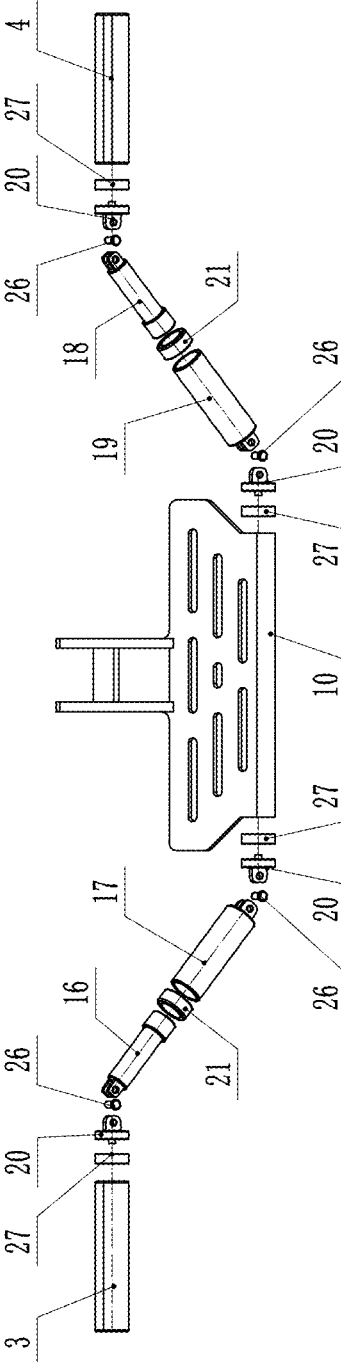
Figure 27:
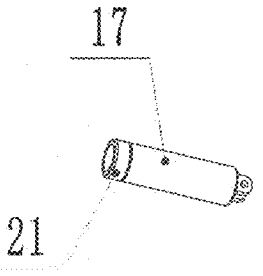
FIG. 27 is an isometric view of the rotatable sliding cylinder included in the telescoping lateral support structure of the exemplary embodiment of FIGS. 19-26.
Figure 28:
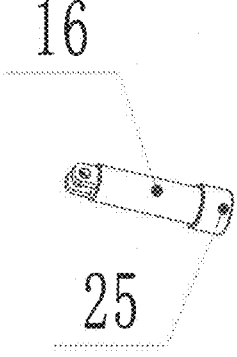
FIG. 28 an isometric view of a rotatable sliding rod assembly for inclusion in the lateral telescoping support structure of the side step assembly illustrated in FIGS. 19-26.
Figure 29:
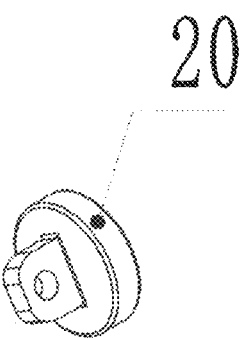
FIG. 29 is an isometric view of a hinge plate assembly for the rotatable sliding rod assembly of FIG. 28.
Figure 30:
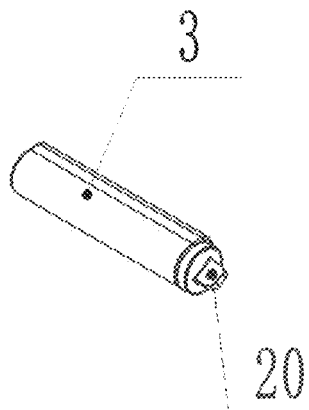
FIG. 30 is an isometric view of a left side swing arm support for the lateral telescoping support structure of the side step assembly of FIGS. 19-26.
Figure 31:
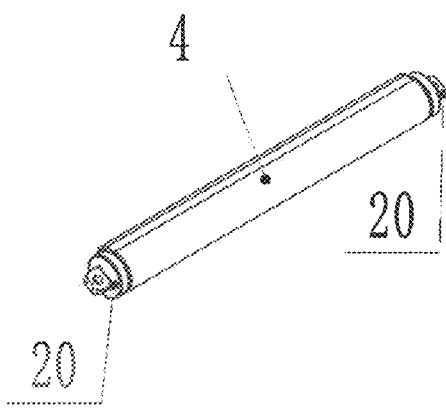
FIG. 31 is an isometric view of a center swing arm support for the lateral telescoping support structure of the side step assembly of FIGS. 19-26.
Figure 32:
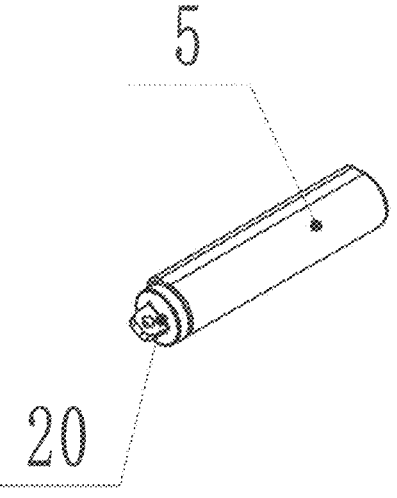
FIG. 32 is an isometric view of a right side swing arm support for the lateral telescoping support structure of the side step assembly of FIGS. 19-26.
Figure 33:
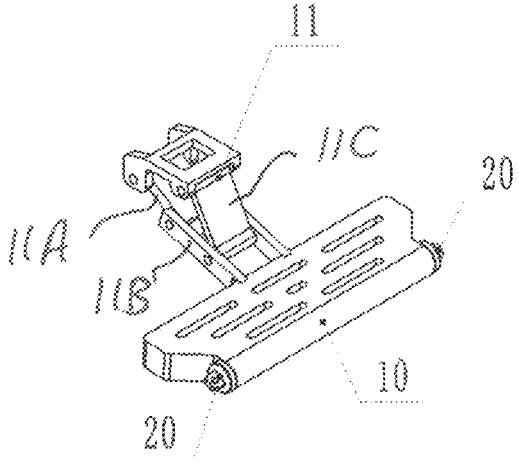
FIG. 33 is an isometric view of a driving linkage mechanism for the side step assembly of FIGS. 1-9.

In the illustrated example, the drop steps 10 are synchronously operated to move from a retracted position, as shown in FIGS. 1-6, to an extended position, as shown in FIGS. 7-9. In the extended position, the steps are positioned so that a person can utilize the steps to assist in entering and exiting a vehicle by standing on the step, at which time the full weight of the person is borne by the step. The movement from and to the extended position is driven by a single electric motor 2 through a respective driving and driven linkage mechanism 11,13 for each step. Power to the right side driven linkage mechanism 13 is transmitted through a connecting rod or shaft 12. Electric motor 2 is capable of bi-directional rotation.

Figure 1:
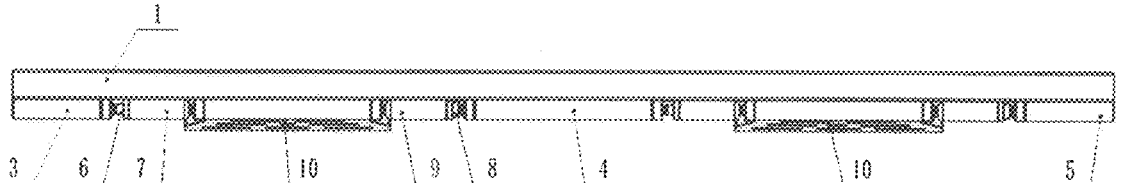
FIG. 1 is a front view of an electric powered side step assembly constructed in accordance with the principles of a first exemplary embodiment of the present invention, with the steps in a retracted state.
Figure 2:
FIG. 2 is the top view of the electric powered side step assembly of FIG. 1.
Figures 3, 4:
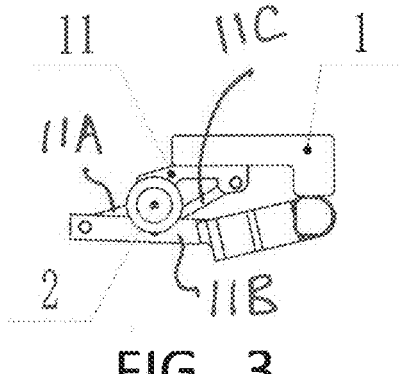
FIG. 3 is the left side view of the electric powered side step assembly of FIG. 1.
FIG. 4 is an isometric view of the electric powered side step assembly of FIG. 1, with the steps in a retracted state.
Figure 5:
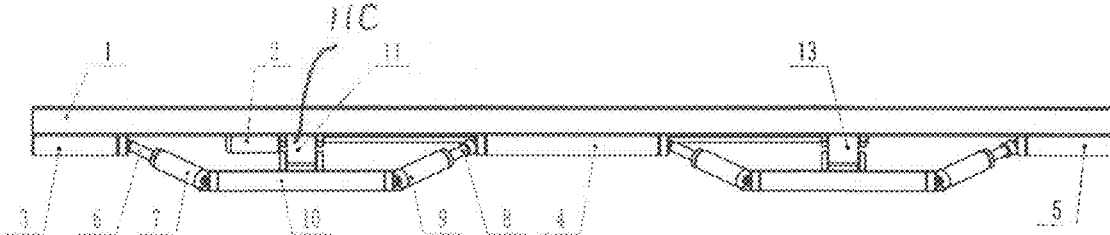
FIG. 5 is a front view of the electric powered side step assembly of FIG. 1, with the steps in an extended state.
Figure 6:
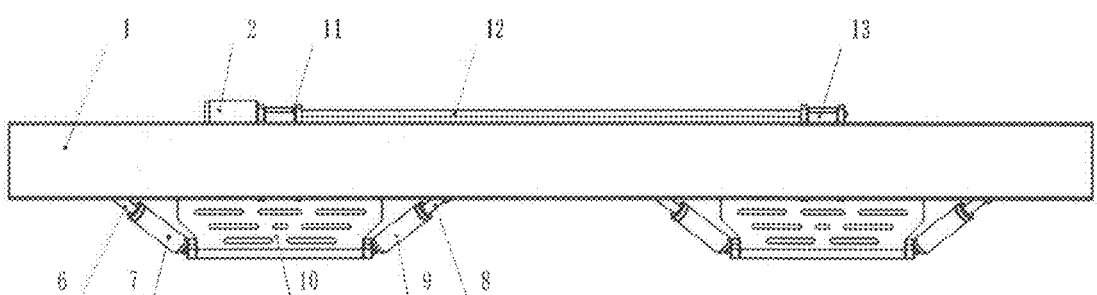
FIG. 6 is a top view of the extended side step assembly shown in FIG. 5.

As illustrated in FIGS. 3 and 7, the driving linkage mechanism 11 may include a driving arm 11A rotated by the motor 2 and pivotally connected to the drop step 10 through an arm 11B fixed to the rear of the step 10, and a driven arm 11C pivotally connected at a first end to the main support bar 1 or a bracket fixed thereto, and at a second end to fixed arm 11B. The lengths and positions of arms 11A and 11C determine the trajectory of the step 10 as it is driven by the electric motor 2 though driving arm 11A.

According to the present invention, the arms 11A to 11C are not required to bear the weight of a person on the step 10, but are only required to transmit power from the electric motor 2 to the step 10 and determine the trajectory of the step as it is extended and retracted. Furthermore, there is no limit to the shape of the trajectory, which may be linear or curved. It is also possible to vary the trajectory to follow a path having varying or compound curvatures, or linear and curved segments, by appropriate design of the driving linkage mechanism, which is not limited to the configuration shown in FIGS. 1-9. The driven linkage mechanism 13 for the second step 10 on the right side of the side step assembly may be, but is not required to be, identical to the driving linkage mechanism 11 for the first step 10 on the left side of the side step assembly.

According to a unique feature of the present invention, loads on the drop steps 10 are borne by the telescoping lateral support structures, which are arranged to support the drop steps 10 over any trajectory or path followed by the drop steps 10 as they are moved by the driving and driven linkage mechanisms 11 and 13 from the retracted to extended position and back, irrespective of the shape of the trajectory or path. The ability of the telescoping lateral support structures to support the drop steps 10 irrespective of the trajectory results from the inclusion, at both ends of a cylinder and rod support structure, of universal joints or connections, as described below.

In the exemplary embodiment of FIGS. 1-19, the telescoping lateral support structures for the left and right side drop steps 10 each includes a left rotatable sliding rod 6 extending from and linearly movable in telescoping fashion relative to a left rotatable sliding cylinder 7, and a right rotatable sliding rod 8 extending from and linearly movable relative to a left rotatable sliding cylinder 9. A left swing arm support 3, a center swing arm support 4, and a right swing arm support 5, each of which is fixed to the main support bar 1. A left ball seat 15 is fastened to the right side of the left swing arm support 3 by connecting bolts 23, a right ball seat 14 is fastened to the left side of the right swing arm support 5 by the connecting bolts 23, and both the left ball seat 15 and the right ball seat 14 are fastened to both sides of the center swing arm support 4 by the connecting bolts 23.

Simultaneously, first and second ball joint seats 24 are respectively screwed into the left ball seat 15 and the right ball seat 14, and first and second ball joints 22 are seated in and universally pivotal with respect to the first and second ball joint seats 24. The first and second ball joints 22 are further screwed into first ends of the left rotatable sliding rod 6 and the right rotatable sliding rod 8, and second ends of the sliding rods 6,8 are fitted with or fastened to a respective limit stop or position stopper 25, and the two ends of the left rotatable sliding cylinder 7 and the right rotatable sliding cylinder 9 are screwed to cylinder end caps 21 and third and fourth ball joints 22. The third and four ball joints 22 are seated in and universally pivotal with respect to third and fourth ball joint seats 24 fastened to a left ball seat 15 fastened to a left side of the drop step 10 and a right ball seat fastened to a right side of the drop step 10. The ball joints 22 and ball joint seats 24 may be fastened to the respective left and right ball seats 15,14, the left and right rotatable cylinder rods 6,8, and the left and right rotatable sliding cylinders 7,9 by including externally threaded portions extending from the corresponding ball joints 22 and ball joint seats 24, which may be screwed into internally threaded openings in the rotatable cylinder rods 6,8 and rotatable sliding cylinders 7,9. It will be appreciated that the manner in which the ball joints and ball joint seats are fastened or secured to the ball seats, rotatable cylinder rods, and rotatable sliding cylinders may be varied, and that the positions of the ball joints and ball joint seats may be reversed so that the ball joint seats 24 are secured to the rotatable cylinder rods 6,8 and rotatable sliding cylinders 7,9 while the ball joints 22 are fixed to the ball seats 14,15 rather than vice versa as illustrated.

Turning to the connection of the telescoping lateral support structures to the drop steps, the left and right sides of the drop step 10 are respectively connected to a left ball seat 15 and a right ball seat 14 through additional connecting bolts 23. The left rotatable sliding cylinder 7 is connected to the ball joint seat 24 of the right ball seat 14 on the drop step 10 through a ball joint 22. The right rotatable sliding cylinder 9 is connected to the ball joint seat 24 of the left ball seat 15 on the drop step 10 through the ball joint 22.

Simultaneously, the left rotatable sliding rod 6 pairs with the left rotatable sliding cylinder 7, and the right rotatable sliding rod 8 pairs with the right rotatable sliding cylinder 9 to complete the universal joint connections at each end of the telescoping lateral support structures for each of the drop steps 10.

In this exemplary embodiment, the limit stop or position limiting mechanisms, which define the extended position of the drop steps 10 and through which loads on the drop steps 10 are transmitted to the cylinder rods 6,8 and cylinder 7,9, the left, center, and right swing arm supports 3,4,5, and ultimately the main support bar 1, include the cylinder end caps 21 and corresponding position stoppers 25 included in each support structure. In the exemplary embodiment, cylinder end caps 21 are each, by way of example and not limitation, threaded and screwed onto one side of the left rotatable sliding cylinder 7 and the right rotatable sliding cylinder 9, while position stoppers 25 may each be screwed onto one side of the left rotatable sliding rod 6 and the right rotatable sliding rod 8.

In operation, when electric motor 2 of the exemplary embodiment of FIGS. 1-18 rotates in a forward direction, it moves driving linkage mechanism 11 into a clockwise direction and, via connecting shaft 12, also drives the driven linkage mechanism 13 to move in the clockwise direction, thereby causing drop steps 10 to extend in diagonally downward direction. Because the left rotatable sliding cylinder 7 and the right rotatable sliding cylinder 9 are connected universally to the left ball seat 15 and the right ball seat 14 of each of the drop steps 10 through the ball joint 22 and ball joint seat 24, the movements of the respective drop steps 10 are enabled by the simultaneous movement of left rotatable sliding cylinder 7 and the right rotatable sliding cylinder 9, which in turn drives the left rotatable sliding rod 6 and the right rotatable sliding rod 8 to extend or slide outwards.

When the position stoppers 25 on the left rotatable sliding rod 6 and the right rotatable sliding rod 8 touch the cylinder end caps 21 on the left rotatable sliding cylinder 7 and the right rotatable sliding cylinder 9, the sliding motion stops, and the drop step 10 completes its extension movement. When electric motor 2 reverses, it moves the driving linkage mechanism 11 in a counterclockwise direction to drive the driven linkage mechanism 13, via connecting rod 12, to cause the drop step 10 to retract diagonally upward.

Because the rotatable sliding cylinder 7 and the right rotatable sliding cylinder 9 are universally connected to the left ball seat 15 and the right ball seat 14 of the drop step 10 through ball joint 22 and ball joint seat 24, the movement of the respective drop steps 10 is in coordination with movement of the left rotatable sliding cylinder 7 and the right rotatable sliding cylinder 9. This action further drives the left rotatable sliding rod 6 and the right rotatable sliding rod 8 to slide in coordination with the left rotatable sliding cylinder 7 and the right rotatable sliding cylinder 9, retracting the drop steps 10. When drop steps 10 touches main support bar 1 during retraction, the sliding motion stops, and the drop steps 10 complete their movement.

FIGS. 19-33 show a second exemplary embodiment of the invention, in which the universal ball joints of the first exemplary embodiment are replaced by bearing hinge plate assemblies.

Figure 34:
FIG. 34 is an isometric view of a bearing for the swing arm supports of FIGS. 29-32.

The main support bar 1, electric motor 2, driving linkage mechanism 11, transmission shaft 12, driven linkage mechanism 13, left swing arm support 3, center swing arm support 4, and right swing arm support 5 may be identical to corresponding elements of the first exemplary embodiment, shown in FIGS. 1-18 and described above. However, the connections between cylinder rods 16 and 18, cylinders 17 and 19, the swing arm supports 3,4,5, and the respective drop steps 10 of the second exemplary embodiment differ as follows:

In this embodiment, one end of the left swing arm support 3 is embedded with a bearing 27, shown in detail in FIG. 34, and a hinge plate 20, shown in detail in FIG. 20, is connected to the left swing arm support 3 through bearing 27 and can rotate relative to one end of the left swing arm support 3. In addition, one end of the right swing arm support 5 is embedded with another bearing 27, while a second hinge plate 20 is connected to the right swing arm support 5 through bearing 27 and can rotate relative to one end of the right swing arm support 5. The left and right ends of the center swing arm support 4 are each also embedded with a bearing 27. Two hinge plates 20 are connected to both ends of the center swing arm support 4 through respective bearings 27 and can rotate relative to both ends of the center swing arm support 4.

The left rotatable sliding rod 16 is connected to the hinge plate 20 on the left swing arm support 3 through a hinged pin 26, and the right rotatable sliding rod 8 is connected to the hinge plate 20 at one end of the center swing arm support 4 through another hinged pin 26. The left and right ends of the drop steps 10 are respectively inlaid with bearings 27, and the left rotatable sliding cylinder 17 is connected to hinge plate 20 at one end of drop step 10 through hinged pin 26. The right rotatable sliding cylinder 19 is connected to the hinge plate 20 at one end of each drop step 10 through a hinged pin 26 so that the left rotatable sliding rod 16 pairs with the left rotatable sliding cylinder 17, and the right rotatable sliding rod 18 simultaneously pairs with the right rotatable sliding cylinder 19.

Finally, as with the first exemplary embodiment, the limit stops or position limiting mechanisms of this embodiment each includes a respective cylinder end cap 21 and position stopper 25. The cylinder end caps 21 are each threaded and screwed onto one side of the left rotatable sliding cylinder 17 and the right rotatable sliding cylinder 19. position stoppers 25 are each screwed onto one side of the left rotatable sliding rod 16 and the right rotatable sliding rod 18.

In operation, when the electric motor 2 rotates forward, it moves driving linkage mechanism 11 for the left drop step 10 in a clockwise direction so that the left drop step 10 extends diagonally downward. At the same time, the connecting rod 12 drives the driven linkage mechanism 13 for the right drop step 10 into motion, thereby causing the right side drop step 10 to also extend diagonally downward. At the same time, the left rotatable sliding cylinder 17 and the right rotatable sliding cylinder 19, which are respectively connected to the hinge plates 20 at the left and right ends of the drop steps 10 through the hinged pins 26, rotate relative to the two ends of the drop step 10 at the same time, in a rotating hinged manner. The movement of the drop steps 10 is thus enabled by the synchronized movement of left rotatable sliding cylinder 17 and the right rotatable sliding cylinder 19, which in turn drives the left rotatable sliding rod 16 and the right rotatable sliding rod 18 to slide outwards, along with the left rotatable sliding cylinder 17 and the right rotatable sliding cylinder 19. When the position stoppers 25 on the left rotatable sliding rod 16 and the right rotatable sliding rod 18 touch the cylinder end caps 21 on the left rotatable sliding cylinder 17 and the right rotatable sliding cylinder 19, the sliding motion stops, and the drop steps 10 complete their extension movement.

When electric motor 2 reverses, it moves the driving linkage mechanism 11 in a counterclockwise direction and, via connecting rod 12, drives the driven linkage mechanism 13 into motion, causing the drop steps 10 to retract diagonally upward. The left rotatable sliding cylinder 17 and the right rotatable sliding cylinder 19 are both connected to hinged plates 20 at the left and right ends of drop steps 10 via hinged pins 26, and therefore can rotate relative to the two ends of drop step 10. The movements of drop steps 10 are in coordination with the left rotatable sliding cylinder 17 and the right rotatable sliding cylinder 19 so that the left rotatable sliding rod 16 and the right rotatable sliding rod 18 are further driven to slide in coordination with the left rotatable sliding cylinder 17 and the right rotatable sliding cylinder 19, retracting the drop step. When drop step 10 touches the main bar 1, the sliding motion stops, and the drop steps 10 complete the retraction movement.

The electric motor 2 that powers the drop step assembly may be connected by a wiring kit (not shown) to a controller or processing unit (also not shown) included in the vehicle, as described in copending U.S. patent application Ser. No. 18/533,801. Bi-directional control of motor rotation to extend and retract the step can be accomplished through an electronic control unit such as the control unit of the vehicle's infotainment system, which may be activated by a vehicle remote controller. Extension may be automatically carried out in response to opening of the corresponding vehicle door, or by a mobile phone app wirelessly connectable to the electronic control unit. Retraction may be initiated upon movement of the vehicle, placement of the vehicle in drive gear, opening and closing of the vehicle's doors, and/or upon detection of other factors. The vehicle Infotainment system or mobile app may be used to set the conditions under which extension or retraction of the step is initiated.

Although preferred embodiments of the invention have been described in connection with the appended drawings, it will be appreciated by those skilled in the art that the description of the preferred embodiments is not intended to be limiting. As a result, it is intended that modifications of the preferred embodiments may be made without departing from the scope of the invention, which should be limited solely by the appended

What is claimed is:

1. An electric powered side step assembly for a vehicle, comprising:
   a main support (1) for securing the electric powered step assembly to the vehicle;
   at least one drop step (10);
   a motor (2) fixed to the main support (1);
   a driving linkage mechanism (11) connected between the motor (2) and the at least one drop step (1) for transmitting power from the motor (2) to cause the drop step (1) to move from a retracted position to an extended position, and from the extended position to the retracted position;
   a telescoping lateral support structure connected between the main support (1) and sides of the drop step (10), and including a left swing arm and a right swing arm,
       wherein the left swing arm includes a left rotatable sliding cylinder (7) and a left rotatable sliding cylinder rod (6) extending from the left rotatable sliding cylinder (7) and linearly movable with respect to the left rotatable sliding cylinder (7)
       the right swing arm includes a right rotatable sliding cylinder (9) and a right rotatable sliding cylinder rod (8) extending from the right rotatable sliding cylinder (8) and linearly movable with respect to the right rotatable sliding cylinder (9), and
   wherein:
   a first end of the left swing arm (6,7) is coupled to the main support (1) by a first universal joint,
   a second end of the left swing arm (6,7) is coupled to the left side of the drop step (10) by a second universal joint,
   a first end of the right swing arm (8,9) is coupled to the main support (1) by a third universal joint,
   a second end of the right swing arm (8,9) is coupled to the right side of the drop step (1) by a fourth universal joint, the left swing arm and the right swing arm each includes a position limiting mechanism (21,25), and the first, second, third, and fourth universal joints are rotatable and enable pivoting of the left and right swing arms (6,7,8,9) in any direction so that the left and right swing arms (6,7,8,9) do not interfere with a trajectory of the at least one drop step (10) during extension and retraction of the at least one drop step (10) by the motor (2) and the driving linkage mechanism (11).

2. An electric powered side step assembly as claimed in claim 1, wherein the left swing arm (6,7) and the right swing arm (8,9) are respectively coupled to the main support (1) by a left swing arm support (3) and a center swing arm support (4) fixed to the main support (1).

3. An electric powered side step assembly as claimed in claim 1, wherein the first, second, third, and fourth universal joints include ball joints (22) and ball joint seats (24), wherein the ball joints (22) are respectively seated in, and universally pivotal relative to, the ball joint seats (24), so as provide a universal joint coupling.

4. An electric powered side step assembly as claimed in claim 3, wherein a first said ball joint seat (24) is fixed to a first left ball seat (15) fastened to the left swing arm support (3), a second said ball joint seat (22) is fixed to a second left ball seat fastened to a left side of the drop step (10), a third said ball joint seat (22) is fixed to a first right ball seat (15) fastened to a right side of the drop step (10), and a fourth said ball joint seat (22) is fixed to a second right ball seat (14) fastened to the center swing arm support (4), wherein a first said ball joint (22) is fixed to an end of the left rotatable cylinder rod (6), a second said ball joint (24) is fixed to an end of the left rotatable cylinder (7), a third said ball joint (24) is fixed to an end of the right rotatable cylinder rod (8), and a fourth said ball joint (24) is fixed to an end of the right rotatable cylinder (9).

5. An electric powered side step assembly as claimed in claim 4, wherein the ball joints (22) are fixed to the ends of the respective left and right cylinder rods (6,8) and the left and right cylinders (7,9) by screwing externally portions extending from the ball joints (22) into internally threaded openings in the respective left and right cylinder rods (6,8) and the left and right cylinders (7,9), wherein the ball joint seats (24) are fixed to the first and second left ball seats (15) and the first and second right ball seats (14) by screwing externally threaded portions extending from the ball joint seats (22) into internally threaded openings in respective left and right ball seats (14,15), and wherein the left and right balls seats (15,14) are respectively fixed to the left swing arm support (3), the left side of the drop step (10), the right side of the drop step (10), and the center swing arm support (4) by a connecting bolt (23).

6. An electric powered side step assembly as claimed in claim 1, wherein the cylinder end caps (21) are fastened to the left and right rotatable cylinders (7,9) by being screwed onto the left and right rotatable cylinders (7,9), and the position stoppers (25) are fastened to one side of the respective left and right rotatable cylinder rods (6,8) by screws.

7. An electric powered side step assembly as claimed in claim 1, wherein the first, second, third, and fourth universal joints include bearings (27) and hinge plates (20).

8. An electric powered side step assembly as claimed in claim 7, wherein the bearings (27) are respectively embedded in a left hinge arm support (3) fixed to the main support (1), a center hinge arm support (4) fixed to the main support (1), and left and right sides of the at least one drop step (10).

9. An electric powered side step assembly as claimed in claim 8, wherein the hinge plates (20) are respectively fastened to the left and right rotatable cylinder rods (6,8) and the left and right rotatable cylinders (7,9), and further coupled to the bearings (27) by hinged pins (26), enabling the left and right swing arms (6,7,8,9) to rotate and pivot in any direction relative to the main support (1) and the sides of the at least one drop step (10).

10. An electric powered side step assembly as claimed in claim 7, wherein the position limiting mechanisms include cylinder end caps (21) fastened to ends of the left and right rotatable cylinders (7,9) and position stoppers (25) fastened to the left and right rotatable cylinder rods (6,8) and movable therewith, such that the position stoppers (25) engage the cylinder end caps (21) when the at least one drop step (10) is in the extended position.

11. An electric powered side step assembly as claimed in claim 1, wherein the position limiting mechanisms include cylinder end caps (21) fastened to ends of the left and right rotatable cylinders (7,9) and position stoppers (25) fastened to the left and right rotatable cylinder rods (6,8) and movable therewith, such that the position stoppers (25) engage the cylinder end caps (21) when the at least one drop step (10) is in the extended position.

12. An electric powered side step assembly as claimed in claim 1, wherein the driving linkage mechanism includes a driving arm (11A) rotated by the motor 2 and pivotally connected to the drop step 10 through an arm (11B) fixed to a rear of the drop step (10, and a driven arm (11C) pivotally coupled at a first end to the main support (1) and at a second end to the fixed arm (11B) such that lengths and positions of the driving, driven, and fixed arms (11A,11B,11C) determine the trajectory of the at least one drop step (10) as it is driven by the motor (2) from the retracted position to the extended position and back.

13. An electric powered side step assembly as claimed in claim 1, wherein the drop step (10) is extended by rotating the motor (2) in a first direction, and retracted by rotating the motor (2) in a second direction opposite the first direction.

14. An electric powered side step assembly as claimed in claim 1, wherein the at least one drop step (10) includes a first drop step having said driving linkage mechanism (11) and a second drop step having a driven linkage mechanism (13), each drop step (1) supported by one said left swing arm and one said right swing arm, and said universal joints, and wherein the driven linkage mechanism (13) is driven by the motor (2) through a rotating connecting shaft (12).

15. An electric powered side step assembly as claimed in claim 1, wherein the electric powered step assembly is unprotected by a dust cover.

* * * * *